Figure 1:
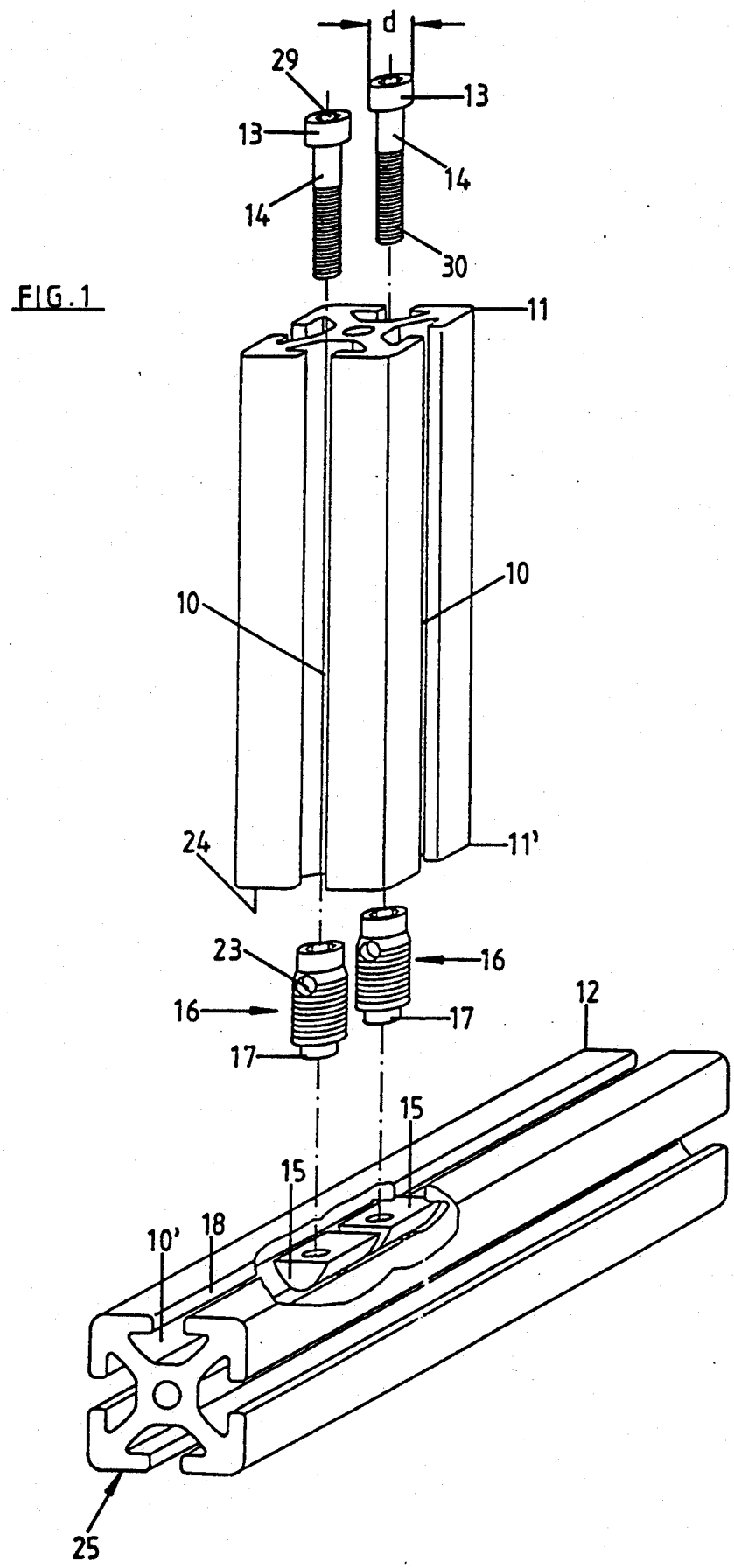

United States Patent

Rixen et al.

[11] Patent Number: 5,192,145
[45] Date of Patent: Mar. 9, 1993

[54] CROSS COUPLING FOR BARS

[76] Inventors: Wolfgang Rixen; Gerrit Pies, both of Friedenstrasse 107-109, 5650 Solingen 11, Fed. Rep. of Germany

[21] Appl. No.: 702,424

[22] Filed: May 20, 1991

[30] Foreign Application Priority Data

May 21, 1990 [DE] Fed. Rep. of Germany ....... 4016320

[51] Int. Cl.$^5$ ............................................. B25G 3/00
[52] U.S. Cl. .................................... 403/255; 403/187; 403/252
[58] Field of Search ............... 403/194, 252, 187, 255, 403/254

[56] References Cited

U.S. PATENT DOCUMENTS 4,021,129  5/1977  Sykes .................................. 403/252
4,775,259  10/1988  Shell ................................ 403/187 X

FOREIGN PATENT DOCUMENTS 0233525  1/1987  European Pat. Off. .
0343942  5/1989  European Pat. Off. .
2136832  7/1971  Fed. Rep. of Germany .
2419092  11/1975  Fed. Rep. of Germany ...... 403/252
3438773  4/1986  Fed. Rep. of Germany .

Primary Examiner—Andrew V. Kundrat
Attorney, Agent, or Firm—O'Keefe & Wilkinson

[57] ABSTRACT

A cross coupling arrangement for two bars disposed at right angles to one another and provided with undercut longitudinal grooves, having a screw bearing a head and disposed parallel to the symmetry axis of a longitudinally running bar in an undercut longitudinal groove of same, whose other end engages a nut disposed in an undercut longitudinal groove of the transversely running bar, and whose head abuts against a cylindrical insert which is installed axially in the undercut longitudinal groove of the bar and which has a through-bore for the screw. In other to improve the cross coupling arrangement such that it can be used largely independently of the cross section of the bar that is to be joined, meanwhile keeping the design simple but without impairing the reliability of the junction, the arrangement is designed such that the axis of symmetry of the cylindrical insert is coaxial with the axis of symmetry of the bore through such insert for the screw, and the outside diameter (D) of the insert is so adapted to the cross section (Q) of the undercut longitudinal groove of the bar that the thread provided on the outside circumference of the cylindrical insert is a self-tapping thread cutting into the material of the bar along the length the insert has a transverse bore the intersection of which the threads form cutting edges.

16 Claims, 3 Drawing Sheets

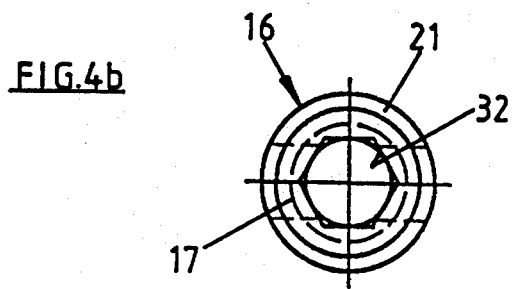
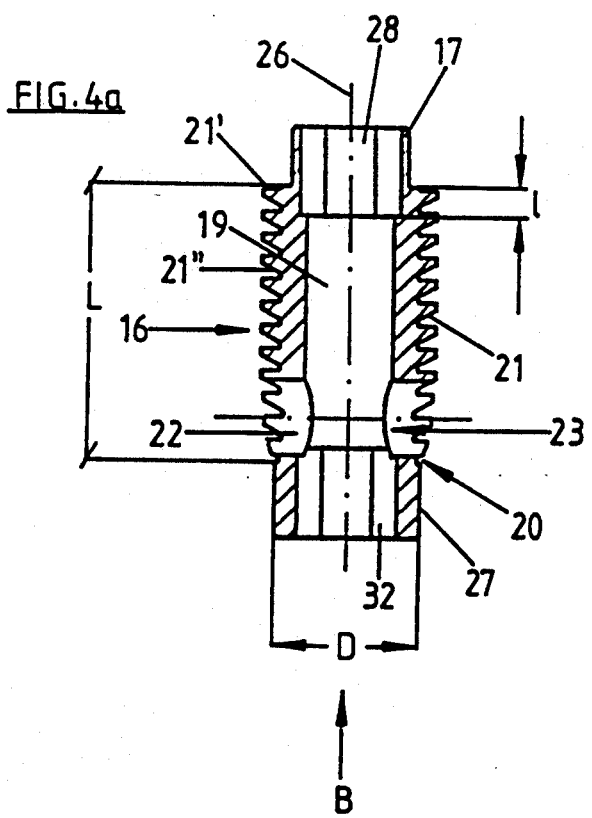

CROSS COUPLING FOR BARS

The invention relates to a cross coupling of two bars at right angles to one another each bar being provided with undercut longitudinal grooves, by means of a screw which has a head at its one end, and which is disposed parallel to the axis of symmetry of an abutting bar in an undercut longitudinal groove of same, and which at its other end engages a nut or threaded fastening disposed in an undercut longitudinal groove of the crossbar, and which with its head abuts against a cylindrical insert installed axially and undisplaceably in the undercut longitudinal groove in the bar and having a through-bore or internal bore to accommodate the screw.

German Patent 34 38 773 A1 discloses a cross coupling of bars with some of the features stated above. However, the insert is short, so that its diameter is greater than its length. Such known cross coupling completely satisfies requirements as regards stability. It is necessary, however, to produce cylindrical openings in the abutting bar transversely of its length, to accommodate the cylindrical insert. Furthermore, a junction can always be noticed by or at the location of the visible cylindrical insert. Lastly, such a bar once provided with cylindrical cross bores cannot be re-used just anywhere because the cross bores always remain visible.

European Patent 0 233 525 B1 has disclosed a cross coupling of two bars whose abutting bar is reusable without limitation after the release of the cross coupling of such bars. The known connecting means consists essentially of three parts, namely a grooved block having connecting threads which can be inserted into the undercut longitudinal groove of the crossbar and to which an intermediate coupling piece is to be releasably fastened, which coupling in turn can be releasably joined to a self-threading nut which can be driven from the end of the abutting bar into its central interior chamber. In such known cross coupling of bars the necessity is avoided of having to produce cross bores or otherwise configured openings to accommodate an insert. The nut provided with a cutting thread, however, attacks the abutting bar centrally. The intermediate coupling or coupling piece therefore requires the use of a non-rotatably fastened centering piece which likewise must enter the central chamber of the abutting bar. Such known self-threading nut and the known intermediate coupling piece must consequently be especially adapted to the size of the central chamber of the abutting bar. Furthermore, the longitudinal grooves are needed in the fastening of the intermediate coupling piece for the installation of screws joining this intermediate coupling piece to the grooved block of the crossbar. Such known cross coupling is therefore complicated and is adapted for application to a single cross section of the abutting bar.

The present invention is addressed to the problem of improving a cross coupling of two bars having the characteristics described above such that it can be used largely regardless of the cross section of the abutting bar, while the design is simple without impairing the reliability of the junction.

This problem presented by the prior art is solved in the following manner: the axis of symmetry of a cylindrical insert is made coaxial with the axis of symmetry of the through-bore for the screw, and the outside diameter of the insert is adapted to the cross section of the undercut longitudinal groove of the bar such that the thread created on the outer circumference of the cylindrical insert provides a self-tapping thread cutting into the material of the bar and within its length the insert has a transverse opening that forms the initial portion of its cutting edges.

For the cross coupling of the invention it is important that the junctions present in the area of alignment of the longitudinal grooves be maintained even when designing the cylindrical insert with self-tapping threads. Securing the abutting bar against rotation relative to the crossbar is therefore undertaken or provided at a comparatively great distance from the axis of the abutting bar. In comparison to the known "quick" cross coupling, the design is considerably simplified, because no intermediate coupling piece is used.

In development or arrangement of the invention, the cross coupling is constructed or effected such that the cylindrical insert is unthreaded at its extremity facing the crossbar, and that the transverse opening in the side of the cylindrical insert that forms cutting edges is a bore, excavation or indentation and is located adjacent the unthreaded portion of the insert. The cylindrical insert consequently has one end with a circumference free of cutting threads, which serves initially for the guidance of the insert when it is driven into the appropriate opening in the end of the abutting bar. Since the transverse opening is a bore excavation or indentation, the unthreaded end of the insert is a component providing stability at the cutting edges, in comparison with making the transverse opening an open-ended slot.

Advantageously, the profile of the cylindrical insert tapers in the area of the cutting-edge-free transverse opening. This configuration of the insert makes it easier to drive or force into the longitudinal groove of the abutting bar.

To facilitate the driving or forcing in of the cylindrical insert, and at the same time increase the resistance of this insert to subsequent extraction, the coupling is configured so that the cutting threads of the insert have steeper flanks facing the crossbar than they have on the screw-head side.

In the case of the cross coupling disclosed in DE 34 38 773 A1, the cylindrical insert is provided with a tip which extends outwardly beyond the corresponding end of the abutting bar into the external slot of the longitudinal groove of the crossbar. The tip has a parallelepipedal shape which, as seen from the outside of the cross coupling, is a radial projection of the cylindrical insert which covers the screw. This tip is disposed within the external slot of the longitudinal groove between the crossbar and a recess in the abutting bar permitting installation of the insert transversely of the abutting bar. To improve the cross coupling so as to substantially improve its resistance to rotation, it is configured such that the tip is a round collar coaxial with the screw and surrounding it, and that the tip and/or the through bore in the cylindrical insert is an unround socket on at least a portion of its length, which can be acted upon from the nut end.

The abutting bar can be rotated with respect to the crossbar only to the extent of the free play of the tip in the longitudinal groove of the crossbar, since the tip is integral with the cylindrical insert.

The cylindrical insert of the present invention is driven into the longitudinal groove of the abutting bar with the aid of a tool engaging the out of round socket. To enable this to be done with conventional tools, and to avoid having to make the out of round socket extend over the entire length of the through-bore or central bore for the screw, the cross coupling is configured so that the out of round socket of the insert tip and/or the through-bore is in the shape of a polygon. A hexagonal socket or so-called hollow socket head, which is widely used, is an example of a polygonal socket.

If the through-bore is configured as an out of round socket at the screw-head end before or adjacent to the transverse hole or opening forming the cutting edges, the cylindrical insert can, after being driven into a longitudinal groove of the abutting bar, be drawn back out by rotating the cylindrical insert for the purpose of precisely aligning the end of the self-tapping thread adjacent the tip with the end face of the abutting bar.

To enable the head of the screw to be as large as possible so as to be able to act upon it with a tool of the greatest possible dimensions, the outside diameter of the head of the screw is made approximately equal to the diameter of the cylindrical insert.

Figure 2:
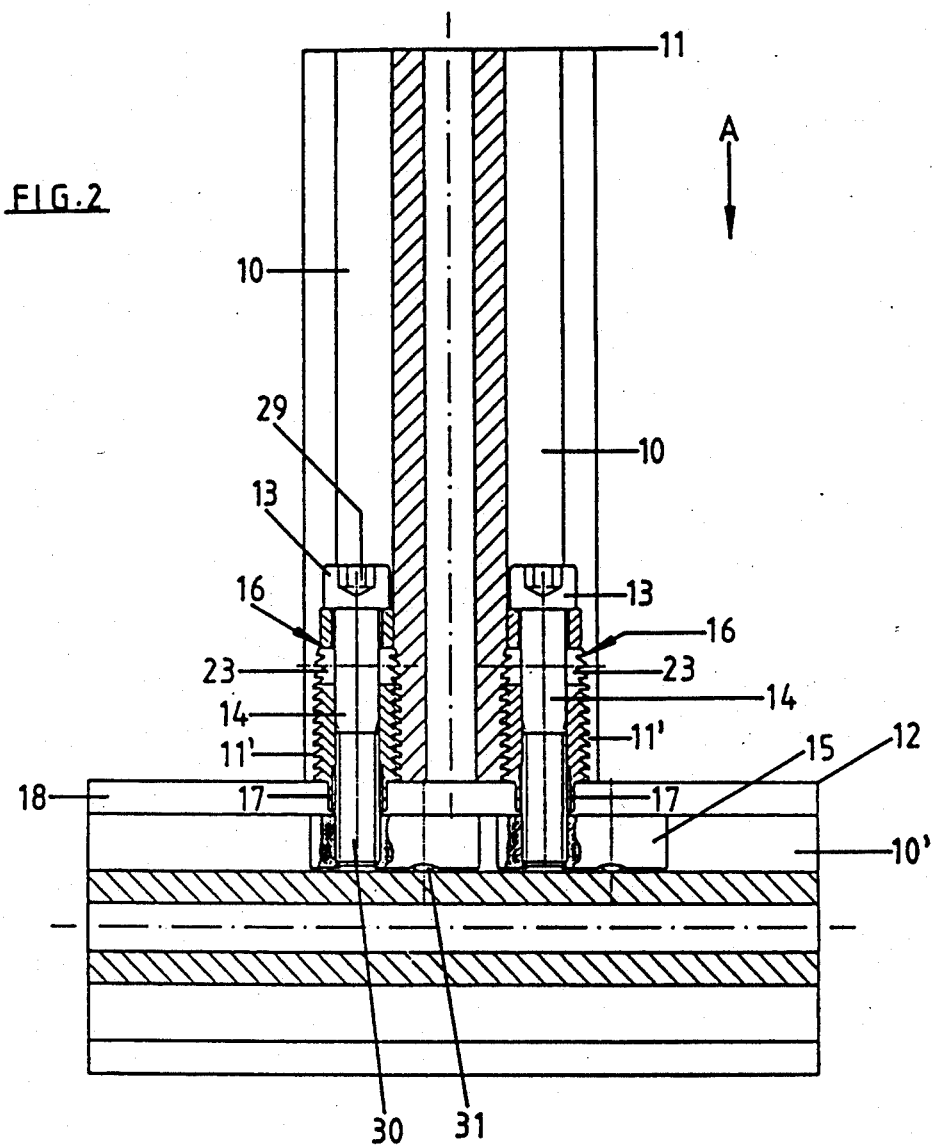
Figure 3:
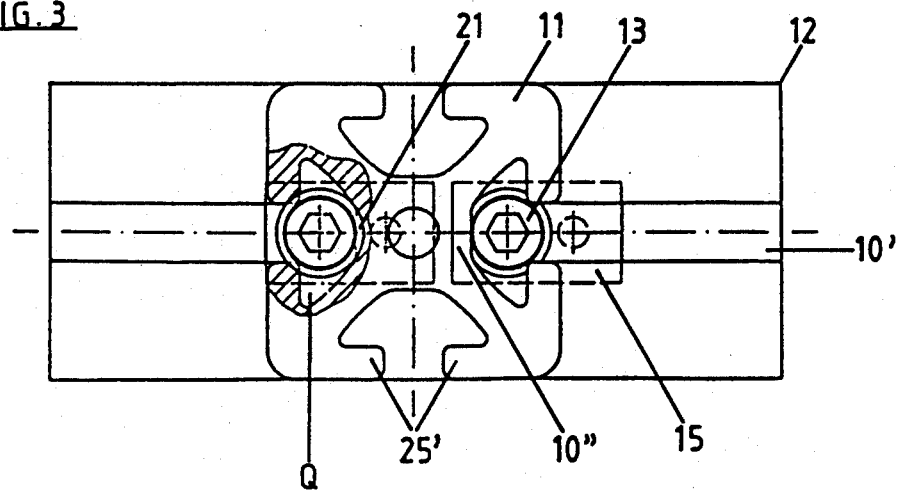

The invention will be explained with the aid of an embodiment represented in the drawing, wherein:

FIG. 1 is a perspective, exploded view of the parts of the cross connection arrangement of the invention FIG. 2 is a longitudinal section through the bars fastened to one another, FIG. 3 is a top view of the bars seen in direction A of FIG. 2, FIG. 4a is an enlarged view of a cross section through a cylindrical insert, and FIG. 4b is a view of the insert of FIG. 4a seen in direction B.

The bar 11 is to be attached nonrotatably to the bar 12 at its butt end 24. Basically, the cylindrical inserts 16, screws 14 and nuts 15 serve for this purpose. It is assumed that the bars 11 and 12 are provided with undercut longitudinal grooves 10. FIGS. 1 to 3 show longitudinal grooves of mushroom-shaped cross section with longitudinal external slots 18 in each side of the bars 11 and 12.

The bars 11 and 12 have the same cross-sectional profile. It is obvious, however, that bars of different cross sections can be fastened to one another provided that the longitudinal grooves 10 are present, which permit the installation of the above-mentioned connecting pieces 14 to 16 i.e. the screws and cylindrical inserts 14 and 16. If the differently-shaped cross sections of the longitudinal grooves 10 are of the same or similar dimensions, then only one configuration of a set of connecting pieces 14 to 16 need be used, which is a considerable advantage in comparison to the known "quick" cross couplings available heretofore.

The cylindrical insert 16 has a through-bore 19 or central opening through its length for accommodating the connecting screw 14. Its outside circumference 20 of such insert is coaxial with the central opening or through-bore 19. Both have, therefore, the same axis 26. The outside diameter D of the cylindrical insert 16 is such that the latter can be fitted into the cross section Q of the longitudinal groove 10. FIG. 3 shows in this connection that the insert 16 is tangent to the groove bottom 10" and to the wall projections 25' forming the external longitudinal slot 18.

The cylindrical insert 16 has a tip 17 in the form of an outwardly extending collar. Such collar is integral with the rest of insert 16 and surrounds the connecting screw 14 coaxially, as can be seen in FIG. 2. The tip 17 is intended for engagement in the external longitudinal slot 18 of the transversely running or extending bar 12. The slot depth thus sets a limit on the maximum length of the tip 17, as it can be seen in FIG. 2. Inside of the tip 17 is an out of round socket 28 having a hexagonal configuration. This out of round inside socket reaches all the way into the through bore 19 so that sufficient length will be available for the entry of a tool by which the insert 16 can be rotatably driven into the longitudinal groove 10 of bar 11.

The self-tapping thread 21, having a saw-tooth configuration, provided on length portion L of the cylindrical insert as shown; in FIG. 4a, serves for fastening the insert 16 in bar 11 through the formation of threads within the grooves 10 of the bar 11. Consequently, steep flanks 21' are present on the tip side, while the opposite flanks 21" of the tapping thread teeth are comparatively gradual. In the threaded portion 21 there is a transverse recess 23 which in the form of a bore or opening into or through the wall of the cylindrical insert. Consequently cutting edges 22 are present in it. In the area of the cutting edges 22 at the circumference of the bore or transverse recess 23 the insert tapers, i.e., the diameter of the self-tapping thread 21 increases from diameter D of the cylindrical insert 16 toward the outside diameter of the thread 21. The self-tapping threads 21 is present only on a portion L of the total length of the insert 16. The remaining portion 27 has exactly the diameter D which allows it to be inserted and guided in the longitudinal grooves 10 in the side 24 of bar 11.

The screw 14 has a head 13 which abuts against the insert 16 when it is installed as in FIG. 2. The diameter d of the head 13 of the screw 14 is only slightly smaller than the diameter D of portion 27 of the cylindrical insert. Consequently, an out of round socket 29 in the head 13 can be provided with comparatively large radial dimensions. The drawing shows a hexagonal socket into which can be inserted the tip of a hexagonal-tip screwdriver with which the screw 14 may be turned. When turned in this manner the end 30 of the screw 14 engages the tap of a nut 15 which is disposed in the longitudinal groove 10' of the bar 12.

In FIG. 1, the nut 15 is shown as having an approximately parabolic cross section, so that it can be inserted sideways into the longitudinal groove 10' of the bar 12, i.e., without having to be pushed along the entire length of the bar. Its relative axial position in bar 12 is secured or maintained by a spring-loaded ball 31. In FIGS. 1 and 2 it is shown that a nut 15 is present for each screw 14. However, a single nut provided with two threaded bores can be used for or to secure both of the screws 14, which has the advantage that only a single positioning of the nut need be performed before engaging the screws 14 into such bores.

The assembly of the bars 11 and 12 is performed first by driving or forcing the cylindrical inserts 16 into the longitudinal grooves 10, the self-tapping threads 21 with their cutting edges 22 creating the necessary threads in the groove bottom 10" and in the edges 25' of the slot. FIG. 3 shows how the thread 21 cuts into the groove bottom.

If the cylindrical insert 16 has been turned too far in, it can be turned back out of the groove 10 by means of a wrench in the out of round socket 32 until the self-tapping thread 21 is flush with side 24 at the tip. For this purpose the cylindrical insert 16 has an out of round socket 32 in the screw head, which is configured as a hexagonal or hollow-head socket. The depth of this socket corresponds approximately to the length of the unthreaded portion 27. With the insert 16 in this position within the groove 10, the tip 17 is as deep as possible in the external slot 18 of the longitudinal groove without, however, reaching the nut 15. Then the screw 14 is passed through the through-bore 19 and the tip 17 and driven or threaded into the nut 15 and tightened, so that the head 13 sits firmly on the insert 16 and thus draws bar 11 with its butt end 24 tightly against bar 12.

We claim:

1. A cross coupling arrangement for two bars disposed at right angles to one another, which bars have undercut longitudinal grooves said coupling arrangement including a threaded fastening with a head at one end, which threaded fastening is disposed parallel to the symmetry axis of longitudinally running bar in an undercut longitudinal groove of same, and the other end of which engages a nut disposed in an undercut longitudinal groove of a transversely running bar, and the head of which extends beyond or behind a cylindrical insert installed axially into the undercut longitudinal groove of the longitudinally running bar, and which has a bore through it for the screw, characterized in that the symmetry axis of the cylindrical insert is coaxial with the symmetry axis of the bore through it for the screw, and the outside diameter of the cylindrical insert is so adapted to the cross section of the undercut longitudinal groove of the longitudinally running bar that a thread provided on the outer circumference of the cylindrical insert provides a self-tapping thread cutting into the material of the bar longitudinally running and having within its length a transversely disposed bore forming cutting edges along the intersection of the bore with the self tapping threads.

2. A cross coupling arrangement according to claim 1, characterized in that the cylindrical insert is thread-free at its end facing the transversely running bar, and that the transverse bore forming the cutting edges is in the form of a bore and is disposed adjacent a cutting-thread-free portion of the insert.

3. A cross coupling according to claim 2, characterized in that the external outline of the cylindrical insert is of a conical configuration in the area of the transverse bore forming the cutting edges.

4. A cross coupling arrangement according to claim 3, characterized in that the cutting threads of the cylindrical insert have steeper flanks facing the transversely running bar than they do on the screw-head side.

5. A cross coupling arrangement according to claim 4, characterized in that the cylindrical insert is provided with a securing tip which extends beyond the corresponding end of the longitudinally running bar into the external slot of the longitudinal groove of the transversely running bar, the said tip being a collar disposed coaxially with the screw and surrounding the latter, and that the securing tip and the bore of the cylindrical insert is configured, at least over a portion of its length, as an out of round socket which can be acted upon from the nut end.

6. A cross coupling arrangement according to claim 5, characterized in that the out of round socket of the securing tip and of the bore is shaped as a polygonal socket.

7. A cross coupling arrangement according to claim 6, characterized in that at the head of the screw and before the transverse bore forming the cutting edges the bore in the end of the cylindrical insert is configured as an out of round socket.

8. A cross coupling arrangement according to claim 7, characterized in that the outside diameter of the head of the screw is approximately equal to the diameter of the cylindrical insert.

9. A cross coupling arrangement for structural bars having undercut grooves in the surfaces comprising:
    (a) a pair of cylindrical inserts having a diameter equal to the minimum inside dimensions of the undercut grooves in the sides of the structural bars,
    (b) said cylindrical inserts having self-tapping thread cutting teeth extending from a portion of exterior diameter and arranged and constructed to thread longitudinally into the interior surfaces of the undercut grooves of a first structural bar with each of the pair of cylindrical inserts positioned in a different groove,
    (c) each cylindrical insert having a central bore extending from one end to the other,
    (d) two elongated externally screw threaded fastening means having a diameter which will be accommodated in the bore of the cylindrical inserts and threads upon the end for threaded interengagement with threads within an internally threaded attachment means constructed and arranged for slidable receipt into an undercut groove of a second structural bar with the internal threads opposite an extended opening into said groove.

10. A cross coupling arrangement in accordance with claim 9 wherein the internally threaded means comprises two separate pieces each adapted for threaded attachment to one of the externally screw threaded fastening means.

11. A cross coupling arrangement in accordance with claim 10 wherein one end of the cylindrical inserts is provided with a non-threaded extension which when two bars are coupled together extends through the opening into the groove into the second structural bar.

12. A cross coupling arrangement in accordance with claim 11 wherein the pair of cylindrical inserts are received in opposite grooves of the first structural bar.

13. A cross coupling arrangement in accordance with claim 12 additionally comprising indentations in opposite sides of the cylindrical inserts adjacent to one end of the self-tapping threads to provide an initial cutting edge on the threaded section.

14. A cross coupling arrangement in accordance with claim 13 wherein the indentations in the opposite sides of the cylindrical inserts are formed by arcuate boxes through the two sides of such insert.

15. A cross coupling arrangement in accordance with claim 14 wherein the central bore of the cylindrical inserts is provided at least at one end with a polygonal inside configuration for interengagement with a polygonal wrench.

16. A cross coupling arrangement in accordance with claim 15 wherein the central bore has a polygonal inside configuration at both ends.

* * * * *